US012589580B2

(12) United States Patent
Ochi et al.

(10) Patent No.: US 12,589,580 B2
(45) Date of Patent: Mar. 31, 2026

(54) FIBER-REINFORCED COMPOSITE MATERIAL AND METHOD FOR PRODUCING PREPREG

(71) Applicant: TORAY INDUSTRIES, INC., Tokyo (JP)

(72) Inventors: Takashi Ochi, Iyo-gun (JP); Yoshikazu Kono, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 469 days.

(21) Appl. No.: 18/010,644

(22) PCT Filed: Jun. 25, 2021

(86) PCT No.: PCT/JP2021/024107
§ 371 (c)(1),
(2) Date: Dec. 15, 2022

(87) PCT Pub. No.: WO2022/004586
PCT Pub. Date: Jan. 6, 2022

(65) Prior Publication Data
US 2023/0339222 A1 Oct. 26, 2023

(30) Foreign Application Priority Data

Jun. 30, 2020 (JP) ................................. 2020-112487

(51) Int. Cl.
*B32B 27/20* (2006.01)
*B32B 1/00* (2024.01)
(Continued)

(52) U.S. Cl.
CPC ................ *B32B 27/20* (2013.01); *B32B 1/00* (2013.01); *B32B 27/08* (2013.01); *B32B 27/12* (2013.01);
(Continued)

(58) Field of Classification Search
CPC ........... B32B 27/20; B32B 1/00; B32B 27/08; B32B 27/12; B32B 33/00; B32B 37/20;
(Continued)

(56) References Cited

U.S. PATENT DOCUMENTS 10,507,900 B2 12/2019 Restuccia et al.
2010/0178487 A1 7/2010 Aral et al.
(Continued)

FOREIGN PATENT DOCUMENTS

JP 2013-67750 A 4/2013
JP 2016147925 A * 8/2016
(Continued)

OTHER PUBLICATIONS

JP-2016147925-A (JP) Google machine translation, Aug. 18, 2016.*
(Continued)

*Primary Examiner* — Tamra L. Dicus
(74) *Attorney, Agent, or Firm* — Birch, Stewart, Kolasch & Birch, LLP

(57) ABSTRACT

A fiber-reinforced composite material including reinforcing fiber layers and a resin layer sandwiched therebetween, wherein conductive particles having a sphericity of 85% or more are disposed in the resin layer, and the fiber-reinforced composite material has a portion where upper and lower reinforcing fiber layers are connected by one conductive particle and has a portion where a conductive particle is sunk in a reinforcing fiber layer. Provided is a fiber-reinforced composite material having sufficient electrical conductivity in a thickness direction with a small addition amount of conductive particles.

10 Claims, 3 Drawing Sheets

(51) Int. Cl.

| | |
|---|---|
| *B32B 27/08* | (2006.01) |
| *B32B 27/12* | (2006.01) |
| *B32B 33/00* | (2006.01) |
| *B32B 37/20* | (2006.01) |
| *B32B 38/00* | (2006.01) |
| *B32B 38/08* | (2006.01) |

(52) U.S. Cl.
CPC .............. *B32B 33/00* (2013.01); *B32B 37/20* (2013.01); *B32B 38/0004* (2013.01); *B32B 38/08* (2013.01); *B32B 2038/0076* (2013.01); *B32B 2262/106* (2013.01); *B32B 2264/108* (2013.01); *B32B 2264/303* (2020.08); *B32B 2305/076* (2013.01); *B32B 2307/202* (2013.01)

(58) Field of Classification Search
CPC ................ B32B 38/0004; B32B 38/08; B32B 2038/0076; B32B 2262/106; B32B 2264/108; B32B 2264/303; B32B 2305/076; B32B 2307/202; B32B 2250/20; B32B 2255/02; B32B 5/02; B32B 5/26; B32B 2255/26; B32B 2260/023; B32B 2260/046; B32B 2307/54; B32B 2307/558; B29C 70/0035; B29C 70/025; B29C 70/086; B29C 70/885

See application file for complete search history.

(56) References Cited

U.S. PATENT DOCUMENTS

| | | | |
|---|---|---|---|
| 2011/0291056 A1* | 12/2011 | Arai | C08J 5/249 |
| | | | 252/511 |
| 2013/0344305 A1 | 12/2013 | Hatanaka et al. | |
| 2014/0037939 A1* | 2/2014 | Misumi | C08J 5/243 |
| | | | 428/327 |
| 2015/0274911 A1 | 10/2015 | Suzuki et al. | |

FOREIGN PATENT DOCUMENTS

| | | | |
|---|---|---|---|
| JP | 2017-132932 A | 8/2017 |
| WO | WO2008/018421 A1 | 2/2008 |
| WO | WO2008/056123 A1 | 5/2008 |
| WO | WO2012/084197 A1 | 6/2012 |
| WO | WO2012/124450 A1 | 9/2012 |
| WO | WO2014/050896 A1 | 4/2014 |

OTHER PUBLICATIONS

International Search Report, issued in PCT/JP2021/024107, PCT/ISA/210, dated Sep. 14, 2021.
Written Opinion of the International Searching Authority, issued in PCT/JP2021/024107, PCT/ISA/237, dated Sep. 14, 2021.
Partial Supplementary European Search Report for corresponding European Application No. 21833608.9, dated Oct. 25, 2023.

\* cited by examiner

100μm

100μm

FIBER-REINFORCED COMPOSITE MATERIAL AND METHOD FOR PRODUCING PREPREG

TECHNICAL FIELD

The present invention relates to a fiber-reinforced composite material and a method for producing a prepreg.

BACKGROUND ART

Heretofore, fiber-reinforced composite materials (hereinafter abbreviated as FRP), which include reinforcing fibers and a matrix resin, are light in weight, yet superior in mechanical properties such as strength and stiffness, heat resistance, and corrosion resistance. Therefore, FRP has been applied to many fields, such as aerospace, cars, railway vehicles, ships, civil engineering and construction, and sports goods. Especially, in applications where high heat resisting performance is required, FRP including continuous reinforcing fibers is used. Carbon fiber (hereinafter abbreviated as CF), which is superior in specific strength and specific elastic modulus, is often used as reinforcing fibers. Thermosetting resins, especially epoxy resins, which are superior in adhesion to CF, heat resistance and elastic modulus and exhibit small cure shrinkage, are often used as matrix resins. In recent years, with increasing use examples of carbon fiber-reinforced composite materials (hereinafter abbreviated as CFRP), characteristics required for CFRP have become severer.

When CFRP is applied to an aircraft, damage due to lightning is concerned as described in Patent Literature 3. In particular, it has been pointed out that in CFRP having an interleaf structure in which reinforcing fiber layers and resin layers are alternately stacked, the resin layers act as electrical insulators, so that such CFRP is insufficient in conductivity. Further, the importance of CFRP, which exhibits conductivity, is described also from the viewpoint of protection from electrostatic dissipation (ESI) and electromagnetic interference (EMI). For this reason, in an aircraft using CFRP, a lightning protection system using a metal foil, a metal mesh, or the like is constructed, but there is a problem that this causes an increase in weight and cost of the aircraft.

Under such circumstances, for example, in a prepreg, which is a kind of a CFRP intermediate base material, it has been proposed that conductive particles such as metal-coated particles are disposed in a resin layer sandwiched between CF layers to improve conductivity in a CFRP thickness direction (Patent Document 1). In addition, there was also an attempt to increase an electrical conductivity by using carbon particles as the conductive particles to be disposed in the resin layer and further incorporating carbon black in the CF layers (Patent Document 2). In addition, Patent Document 3 describes that regarding the volume resistivity in the Z direction, "The decrease in Example 11 using silver-coated glass spheres having a size substantially equal to the thickness of the polymer resin layer is particularly large.", and also describes that from the comparison with Examples 10 and 12, it is preferable to use conductive particles having a size almost equal to the thickness of the resin layer. Patent Document 4 [0038] describes that when the ratio [O/C] of the number of all oxygen atoms to the number of all carbon atoms measured by X-ray photoelectron spectroscopy in a carbon fiber is 0.12 or less, mechanical characteristics and conductivity of CFRP are balanced well.

PRIOR ART DOCUMENT

Patent Documents

Patent Document 1: WO 2008/018421 A1
Patent Document 2: WO 2012/124450 A1
Patent Document 3: WO 2008/056123 A1
Patent Document 4: Japanese Patent Laid-open Publication No. 2013-067750

SUMMARY OF THE INVENTION

Problems to be Solved by the Invention

However, the volume resistivity values in the thickness direction of the CFRPs disclosed in Examples of Patent Document 1 were $2.0 \times 10^2$ Ωcm or more (0.5 S/m or less), and sufficient conductivity was not obtained. In addition, Patent Document 2 discloses a technique of using conductive particles and carbon black in combination for improving conductivity. However, with reference to Comparative Example 6 of Patent Document 2, when carbon black was not incorporated in the CF layers and only carbon particles were disposed in the resin layer, even though a large amount as much as 10 parts of carbon particles were added, the volume resistance value in the thickness direction of CFRP was $2.5 \times 10^2$ Ωcm (0.4 S/m) and the conductivity was insufficient. Patent Document 3 describes that a sufficient volume resistance value in the thickness direction of CFRP can be obtained by adding a large amount of silver-coated glass spheres, but the conductive particles used in Patent Documents 1 to 3 are generally expensive, and there is a problem that an excessively high cost is needed in order to impart sufficient conductivity to CFRP. Therefore, it is preferable to reduce the addition amount of the conductive particles, but with reference to Examples of Patent Document 3, the reduction in the addition amount of the conductive particles is incompatible with the improvement in the conductivity of CFRP. Furthermore, for example, as described in Examples of Patent Document 2, when classification or the like is performed to sharpen the particle size distribution of conductive particles, the yield of the conductive particles decreases, and as a result, there also is a problem that the price of conductive particles further increases.

A challenge of the present invention is to provide a fiber-reinforced composite material having a sufficient electrical conductivity in a thickness direction with a small addition amount of conductive particles.

Solutions to the Problems

In order to solve the above problems, the present invention has found that the electrical conductivity in a thickness direction is increased by controlling an FRP structure.

The fiber-reinforced composite material of the present invention is a fiber-reinforced composite material including reinforcing fiber layers and a resin layer sandwiched therebetween, wherein conductive particles having a sphericity of 85% or more are disposed in the resin layer, and the fiber-reinforced composite material has a portion where upper and lower reinforcing fiber layers are connected by one conductive particle and has a portion where a conductive particle is sunk in a reinforcing fiber layer.

Effects of the Invention

According to the fiber-reinforced composite material of the present invention, the addition amount of expensive conductive particles can be reduced, and a fiber-reinforced composite material sufficient in conductivity in the thickness direction and in impact resistance can be obtained at a lower cost. In addition, the application of such a fiber-reinforced composite material to aircrafts can simplify conventional lightning protection systems and can contribute to weight reduction and cost reduction of aircrafts.

EMBODIMENTS OF THE INVENTION

Figure 1:
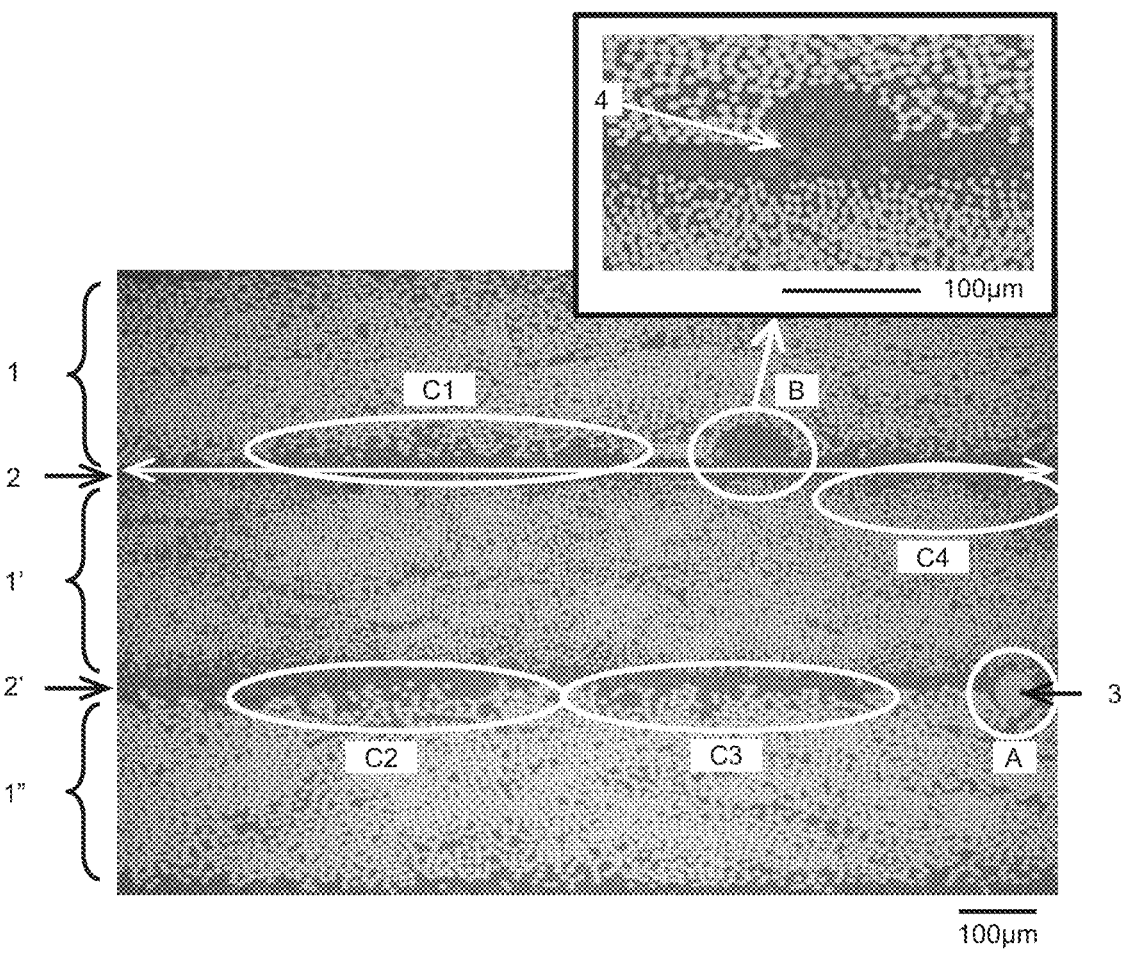
FIG. 1 is a diagram showing one example of a cross section of a fiber-reinforced composite material according to the present invention.

Hereinafter, the present invention will be described in more detail.

Examples of the reinforcing fiber include carbon fiber, glass fiber, metal fiber, metal oxide fiber, metal nitride fiber, and organic fiber (e.g., aramid fiber, polybenzoxazole fiber, polyvinyl alcohol fiber, polyethylene fiber, polyamide fiber, polyester fiber, and fiber made of cellulose or a derivative thereof). Carbon fiber and metal fiber, which have conductivity, are preferable, and carbon fibers are particularly preferable from the viewpoints of mechanical characteristics and lightweight properties of a resulting FRP.

Reinforcing fibers are generally used in the form of a reinforcing fiber bundle in which a large number of single fibers are bundled. For example, in the case of carbon fiber, an item in which approximately 1,000 to 1,000,000 single fibers are assembled in a tape form is usually called a "tow", and a reinforcing fiber sheet can be obtained by arranging such tows. An item in which reinforcing fibers are arranged in unidirection (UD) in the longitudinal direction is referred to as a UD material, and an item in which reinforcing fibers are arranged in multiple directions is referred to as a reinforcing fiber fabric. When the mechanical characteristics of FRP are prioritized, a UD material tends to be used, and when FRP having a complicated shape is prepared, a reinforcing fiber fabric tends to be used. Examples of the reinforcing fiber fabric include materials in which reinforcing fibers are two-dimensionally arranged in multiple axes, such as woven fabric and knitted fabric, and materials in which reinforcing fibers are randomly oriented, such as nonwoven fabric, mat, and paper.

When carbon fiber is used as the reinforcing fiber, it is preferable that the ratio of the number of all oxygen atoms to the number of all carbon atoms on the surface of the carbon fiber measured by X-ray photoelectron spectroscopy, that is, the so-called surface oxygen concentration [O/C] is 0.12 or less because the mechanical characteristics and the electrical conductivity of FRP are balanced. The [O/C] is more preferably 0.10 or less. Patent Document 4[0126]

describes that the [O/C] can be set to 0.10 by performing electrical treatment with an aqueous solution of sulfuric acid.

FRP can be obtained by preparing an intermediate base material in which the reinforcing fiber sheet is impregnated with the matrix resin and molding the intermediate base material. Here, the FRP of the present invention has a plurality of reinforcing fiber layers and a resin layer sandwiched therebetween, and the aforementioned reinforcing fiber sheet forms the reinforcing fiber layers. Conductive particles are disposed in the resin layer sandwiched between the plurality of reinforcing fiber layers.

It is important that the FRP of the present invention has a portion where upper and lower reinforcing fiber layers is connected by one conductive particle. This means that one focused conductive particle is substantially in contact with the upper and lower reinforcing fiber layers to form a conductive path in the thickness direction of the FRP. Usually, the particle size distribution of conductive particles has a certain variation. In the FRP of the present invention, there is at least one or more conductive particles capable of forming a conductive path by one conductive particle. Here, "be substantially in contact" means the following. When in an FRP cross-sectional photograph, there were three or more reinforcing fibers having a distance of 7 μm or less from the surface of a conductive particle in a reinforcing fiber layer adjacent to the conductive particle, it was determined that the conductive particle was in contact with the reinforcing fiber layer. Then, when one focused conductive particle was in contact with both the upper and lower reinforcing fiber layers, it was determined that the upper and lower reinforcing fiber layers were connected by one conductive particle. When it is determined whether or not a conductive particle is substantially in contact with a reinforcing fiber layer using an FRP cross-sectional photograph, the FRP cross-sectional sample has not necessarily been prepared in a cross section showing the largest cross section of a spherical conductive particle, and therefore the determination is made based on the threshold value described above. An example of this state is shown in region A in the cross-sectional photograph of the FRP of the present invention shown in FIG. 1. Of course, the possibility that a plurality of conductive particles having a smaller diameter are connected together to form a conductive path may not be zero, but this situation is very small in frequency and is considered to be negligible.

Therefore, the size of the conductive particles is preferably a certain value or more, and specifically, it is preferable to contain conductive particles having a diameter of 15 μm or more. The diameter of the contained conductive particles is more preferably 30 μm or more, and even more preferably 50 μm or more. The diameter refers herein to the maximum value of a diameter (the maximum diameter) in the cross section of a conductive particle found in an FRP cross-sectional photograph taken at a magnification of 200 times. The average diameter (the average particle diameter) of the conductive particles to be added at the time of preparing an intermediate base material of a prepreg or the like before FRP formation is preferably 10 μm or more, and more preferably 20 μm or more. When the average diameter of the conductive particles is excessively large, the balance with the resin layer thickness is deteriorated to disorder the interleaf structure of the FRP, and therefore the average diameter is preferably 60 μm or less. The average particle diameter of the conductive particles can be measured by applying a light scattering method and using, for example, Partica LA-950V2 manufactured by HORIBA, Ltd., MT3300 II manufactured by Microtrac Inc., or SALD series manufactured by Shimadzu Corporation.

In addition, the conductive particles contained in the FRP of the present invention have a sphericity of 85% or more. The sphericity of the conductive particles is preferably 90% or more. This makes it possible to exhibit stable conductive performance regardless of the disposition of the conductive particles in the resin layer. In addition, it is possible to suppress an excessive increase in the viscosity of the matrix resin forming the resin layer, and it is also possible to suppress the occurrence of a trouble at the time of preparing an FRP intermediate base material. Here, the sphericity is determined by randomly selecting 30 conductive particles in an FRP cross-sectional photograph, and calculating a sphericity from the minor axis length and the major axis length thereof according to the following mathematical formula.

$$S = \sum_{i=1}^{n}(b/a)/n \times 100 \qquad \text{[Mathematical Formula 1]}$$

S: sphericity, a: major axis length, b: minor axis length, and n: number of measurements 30.

It is important that at least some of the conductive particles are sunk in the reinforcing fiber layer. This will be described using an FRP using a UD material as an example. In an FRP cross section, in an FRP of the conventional technique, the boundary between a reinforcing fiber layer and a resin layer has irregularities at the single fiber level of the reinforcing fiber, but it can be approximated by a straight line. For example, a cross-sectional photograph of a laminated prepreg is shown on the left side of FIG. 1 of Patent Document 1, and there is shown a state in which the boundaries of a resin layer sandwiched between a CF layer and another CF layer are substantially straight, conductive particles are disposed in the resin layer, and the conductive particles connect the CF layers.

Figure 2:
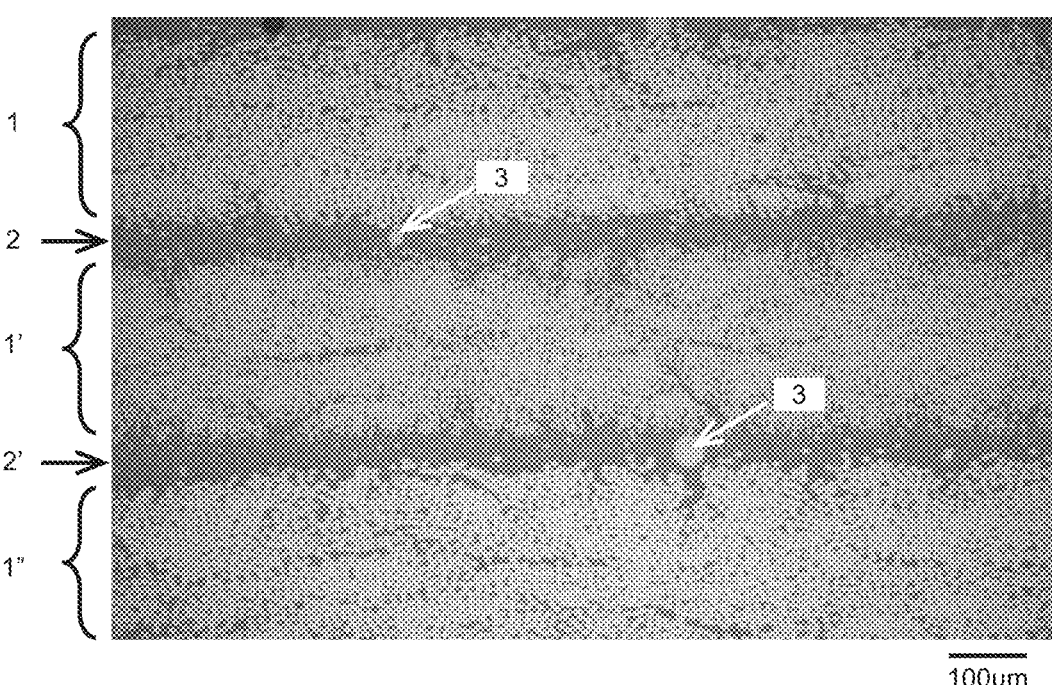
FIG. 2 is a diagram showing one example of a cross section of a fiber-reinforced composite material that does not correspond to the present invention.

On the other hand, the FRP of the present invention will be described in detail with reference to FIG. 1. In FIG. 1, an assembly of small white circles in the reinforcing fiber layers 1, 1', 1" shows a cross section of a reinforcing fiber bundle. In addition, the dark portions sandwiched between the upper and lower reinforcing fiber layers 1, 1' and 1', 1" are resin layers 2, 2', and the dark circles in the resin layers 2, 2' show cross sections of polymer particles 4 for interlayer reinforcement. The white circle existing in the resin layer 2' and being clearly larger than the cross section of the reinforcing fiber bundle shows the cross section of a conductive particle 3. As shown in the region A in FIG. 1, the conductive particle 3 (here, carbon particle) is disposed in the resin layer 2' between the reinforcing fiber layers 1' and 1", and the boundary line between the reinforcing fiber layer 1" (here, CF layer) and the resin layer 2' is not substantially straight but is recessed in an arc shape along the conductive particle 3. In the present invention, that a conductive particle is sunk in a reinforcing fiber layer refers to a state in which in an FRP cross-sectional photograph, a conductive particle is observed, a boundary line of the reinforcing fiber layer in contact with the conductive particle is recessed in an arc shape along the shape of the conductive particle, and a recess depth (length of sinking) described later is 15 μm or more. The phrase "have a sinking portion" means that in an FRP cross-sectional photograph, one or more sites where conductive particles are sunk in a reinforcing fiber layer are observed per 50 mm of the resin layer length. "Per 50 mm of the resin layer length" is defined as described later. On the other hand, in FIG. 1, the regions shown in C1 to C4 are in a state in which the boundary between a reinforcing fiber layer and a resin layer is merely disordered, which is clearly different from the state in which a conductive particle is sunk in a reinforcing fiber layer. That is also different from the case where a conductive particle is located by chance at a portion where the boundary of the reinforcing fiber layer undulates. FIG. 2 illustrates an FRP that is prepared by a method different from the FRP of FIG. 1 using the same reinforcing fiber, the same matrix resin, and the same conductive particles (their contents are also the same) as those of the FRP of FIG. 1 and does not correspond to the present invention. A conductive particle 3 is observed also in the resin layer 2 in FIG. 2, but the boundary line between the reinforcing fiber layers 1' and 1" near the conductive particle 3 is substantially straight and is not arcuate like the region A in FIG. 1, that is, a region in which a conductive particle 3 "is sunk" in the reinforcing fiber layers 1' and 1" cannot be observed. When the average thickness of the resin layer located between the two reinforcing fiber layers was compared, the thickness of the resin layer was 39 μm and the electrical conductivity in the thickness direction was 16 S/m in the FRP of FIG. 1, whereas the thickness of the resin layer was as thick as 47 μm and the electrical conductivity in the thickness direction was 13 S/m in the FRP of FIG. 2, that is, the electrical conductivity was lower than that of the FRP of FIG. 1. As described above, in the FRP of the present invention, as a result of "sinking" of conductive particles in the reinforcing fiber layers to reduce the thickness of the resin layer between the reinforcing fiber layers. It is considered that this increases the number of conductive particles capable of connecting the upper and lower reinforcing fiber layers per unit area, and as a result, the electrical conductivity in the FRP thickness direction is increased. Conversely, when the same electrical conductivity in the thickness direction as that of the FRP of the conventional technique is to be obtained, the amount of the conductive particles to be contained can be reduced.

Next, the recess in the region B in FIG. 1 will be considered. Although no conductive particles 3 are observed in this portion, it is considered that conductive particles exist on the front side or the back side of the FRP cross-sectional photograph and a gap between the conductive particles and a reinforcing fiber layer is observed as the recess in the region B. Since the boundary line of the region B appears to be a part of an ellipse, there is a possibility that about two conductive particles are adjacent to each other.

The "sinking" of the conductive particles is just required to occur in at least one of the upper and lower reinforcing fiber layers. In the region A in FIG. 1, there is shown an example in which a conductive particle 3 is sunk only in the lower reinforcing fiber layer 1".

Figure 4:
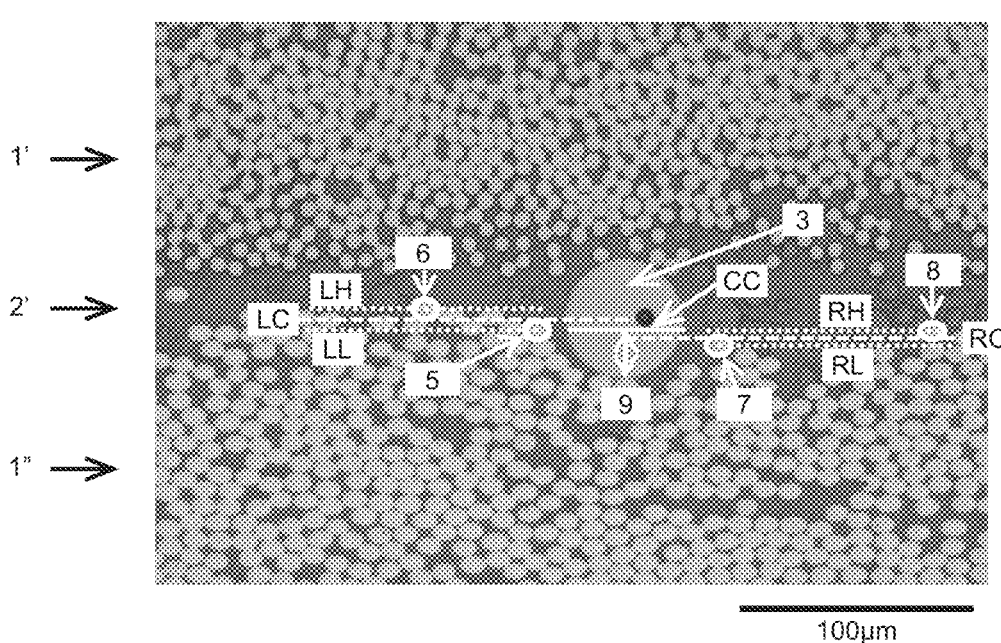
FIG. 4 is a view showing an enlargement of a conductive particle sinking portion in one example of a cross section of a fiber-reinforced composite material of the present invention.

The "amount of sinking" is defined as follows. This will be described with reference to FIG. 4, in which the region A in FIG. 1 is enlarged. First, a boundary line between a reinforcing fiber layer 1" and a resin layer 2' is determined. On the left side of the left-most end of a conductive particle 3, an auxiliary line LL (indicated by a thin broken line) is drawn at the center of a reinforcing fiber (denoted as a reinforcing fiber 5 in FIG. 4) that is closest to the conductive particle and is located at the boundary with the resin layer. Then, an auxiliary line LH (indicated by a fine broken line) is drawn at the center of a reinforcing fiber (denoted as a reinforcing fiber 6 in FIG. 4) that is located closest to the resin layer up to 100 μm on the left side from the reinforcing fiber 5 (in FIG. 4, a length of 100 μm from the center of the reinforcing fiber 5 is taken). Then, an auxiliary line LC (indicated by a medium broken line) is drawn at the middle of the auxiliary lines LL and LH. In the photograph of FIG. 4, the reinforcing fibers 5 and 6 are each indicated by surrounding by a white ellipse. The reason that the reinforcing fibers in the reinforcing fiber layer 1" have elliptical cross sections in FIG. 4 is that the reinforcing fibers in the reinforcing fiber layer 1" are arranged at 45°. The same operations are done on the right side, and the auxiliary lines RL, RH, and RC are drawn. An auxiliary line CC (indicated by a solid line) is drawn between LC and RC. Then, a perpendicular line (indicated by a solid double-headed arrow) is drawn from the auxiliary line CC toward a vertex of the portion where the boundary line between the reinforcing fiber layer 1" and the resin layer 2' is recessed in an arc shape, and the length of the vertex is defined as a "length of sinking 9". All the auxiliary lines are drawn so as to be parallel to the resin layer.

In FIG. 4, the "length of sinking" is 21 μm. Then, a value obtained by dividing the length of sinking of the conductive particle by the cross-sectional diameter of the target conductive particle is defined as the amount of sinking of the conductive particle. Since the cross-sectional diameter of the conductive particle 3 in the region A is measured to be 53 μm, the amount of sinking is calculated to be 40%. As to the amount of sinking, three conductive particles connecting the reinforcing fiber layers are randomly selected, and the average value of their amounts of sinking is taken. When one conductive particle sinks in both the upper and lower reinforcing fiber layers, a larger amount of sinking is adopted as the amount of sinking of the conductive particle. The amount of sinking is preferably 10% or more. The sinking amount is more preferably 15% or more, and even more preferably 20% or more.

Figure 5:
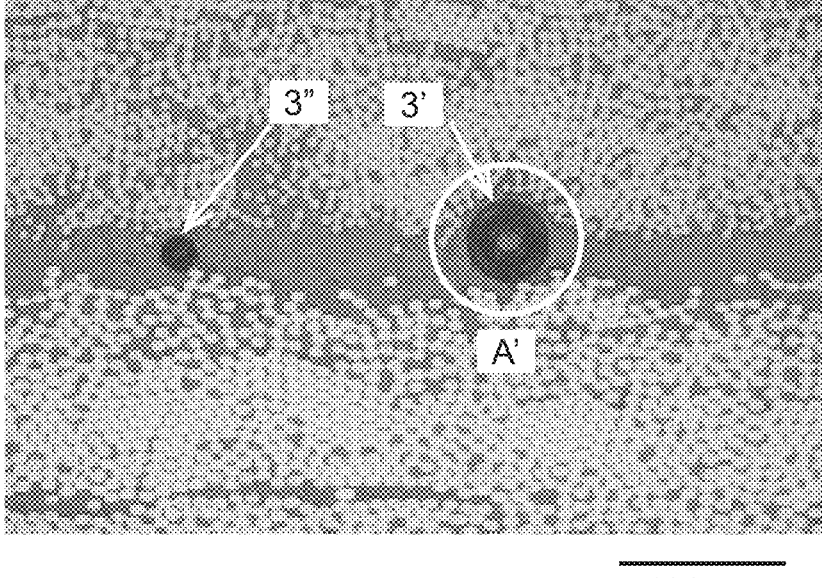
FIG. 5 is a diagram showing one example of a cross section other than FIG. 1 of the fiber-reinforced composite material according to the present invention.

Further, another cross section of the FRP of the present invention is shown in FIG. 5. Here, two black circles 3' and 3" (regions each considered as a trace of a conductive particle cracking and partially falling off (the same applies hereinafter)) can be observed. Since the central parts of the black circles 3' and 3" appear white, these are considered to be traces of conductive particles cracking and partially falling off during the preparation of the cross section. In particular, the region indicated by A' on the right side is considered to be a "sinking" portion of the conductive particle because the boundary line of the reinforcing fiber layer located above the black circle 3' is recessed in an arc shape. However, since there are many uncertain factors in calculating the length of sinking of a conductive particle, the cross-sectional photograph like FIG. 5 is not used for calculating the amount of sinking. For the calculation of the amount of sinking, a cross-sectional photograph in which a conductive particle 3 can be clearly observed like FIG. 1 is used. The black circle 3" on the left side of FIG. 5 is not taken as a "sinking" portion because the boundary lines of the upper and lower reinforcing fiber layers are not in a clear arc shape.

Figure 3:
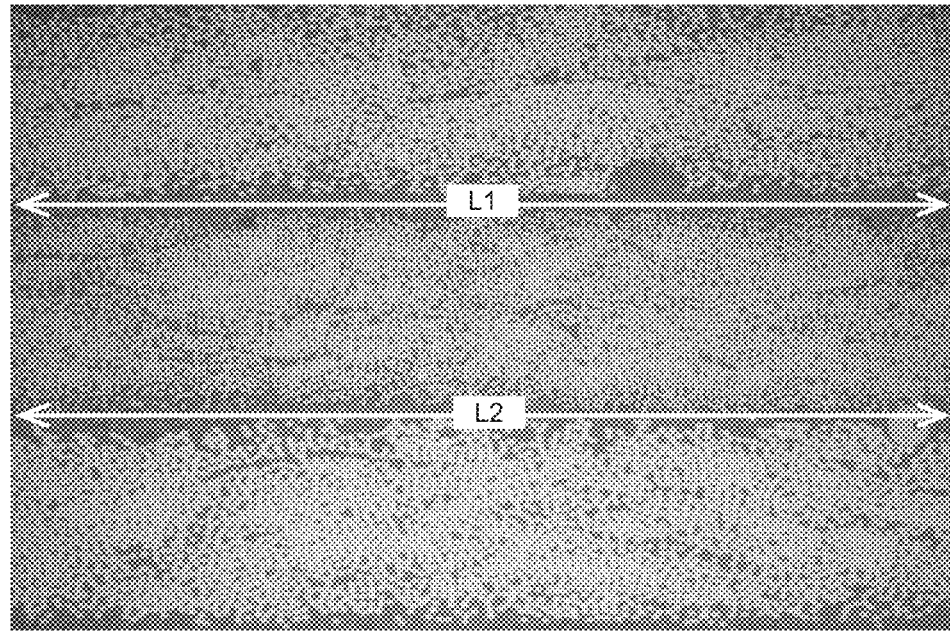
FIG. 3 is a diagram explaining the length of a resin layer in a cross section of a fiber-reinforced composite material of the present invention.

The number of conductive particles sunk in a reinforcing fiber layer is preferably 2 or more per 50 mm of the resin layer length. The number of conductive particles sunk in a reinforcing fiber layer per 50 mm of the resin layer length may be referred to as a frequency of sinking. Here, the sunk conductive particle refers to a conductive particle that can be clearly observed as shown in the region A of FIG. 1. In addition, the resin layer length means the length (L) of a straight line passing through the center of the resin layer when an FRP cross-sectional photograph is taken. In FIG. 3, the magnification at the time of taking the cross-sectional photograph is 200 times. FIG. 3 is a view explaining the length of a resin layer in a cross section of an FRP of the present invention. In FIG. 3, two resin layers are observed, and the lengths of the resin layers are L1 and L2, respectively. In addition, photographs as many as a sufficient length (50 mm or more) of a resin layer can be obtained are taken with random selection of FRP cross sections. In FIG. 3, since L1+L2=2.4 mm, 21 or more similar photographs are required to measure the number of conductive particles per 50 mm of the length of a resin layer.

In addition, it is preferable that polymer particles have flowed in the periphery of the conductive particle sunk in reinforcing fibers. Focusing on the region B in FIG. 1, it can be seen that the boundary between the reinforcing fiber layer 1 and the resin layer 2 is recessed in an elliptical arc shape. A state in which the polymer particles 4 have flowed in the recess is observed. This indicates that the polymer particles 4 have flowed in the periphery of the conductive particle 3 sunk in the reinforcing fiber layer 1. In the FRP of FIG. 1, the resin layer 2 contains the polymer particles 4, but it is considered that the polymer particles 4 flow into the recess to reduce the amount of the polymer particles 4 present in the resin layer, resulting in a decrease in the thickness of the resin layer. In a so-called interleaf structure, polymer particles which are interlayer-reinforcing particles serve as spacers and control the interlayer thickness, and thus it is considered that such a phenomenon occurs. Initially, it was considered that conductive particles having a size larger than that of the polymer particles serve as spacers to determine the thickness of the resin layer. However, as shown in FIGS. 1 and 2, the frequency of the conductive particles is much lower than that of the polymer particles, and therefore it is considered that the polymer particles as a major component control the thickness of the resin layer. The decrease in the thickness of the resin layer improves the electrical conductivity in the thickness direction of the FRP.

In the FRP of the present invention, it is preferable that the thickness of the resin layer and the linearity of the reinforcing fibers are as uniform as possible in portions other than the "sinking" portion from the viewpoint of improving the mechanical properties of the FRP.

As conductive particles to be used in the present invention, metal particles, metal oxide particles, metal-coated inorganic particles, organic polymer particles, carbon particles, and the like can be used. Among them, carbon particles are preferable because they have no corrosion problem even when used for an aircraft. Further, when carbon particles having a (002) plane spacing of 3.4 to 3.7 angstroms are used, conductivity is easily improved, which is preferable. For example, as an example of carbon particles, it is described in Carbon, No. 168, 157-163 (1995) that ICB manufactured by Nippon Carbon Co., Ltd. has a (002) plane spacing of 3.53 angstroms, and is a substantially truly spherical carbon particle. In addition, it is described that the truly spherical carbon particles are very hard, are hardly deformed even when being subjected to compressive deformation, and the particle shape returns to the original shape when the compression is removed. When an FRP is used as a structural material of an aircraft, deformation is imparted to the structural material as represented by bending of a main wing during flight, but an FRP containing truly spherical carbon particles is expected to exhibit stable conductivity because the truly spherical carbon particles are less likely to have irreversible deformation. Further, if necessary, a conductive filler, a short fiber, or a conductive nanomaterial may be used in combination.

Incidentally, from the viewpoint of interlayer reinforcement, it is preferable that polymer particles are disposed in the resin layer sandwiched between the plurality of reinforcing fiber layers. As a result, the interlaminar toughness of the FRP can be improved, and impact resistance, which is important for aircraft applications, can be improved. As the polymer particles, polyamide particles or polyimide particles can be preferably used. Polyamide, which can greatly improve impact resistance owing to its superior toughness, is most preferable. As the polyamide, nylon 12, nylon 11, nylon 6, nylon 66, a nylon 6/12 copolymer, nylon formed into a semi-IPN (interpenetrating polymer network structure) with the epoxy compound disclosed in Example 1 of Japanese Patent Laid-open Publication No. 01-104624 (semi-IPN nylon), and the like can be suitably used. The shape of the polymer particles is preferably spherical, especially truly spherical because the effect of improving the impact resistance of FRP is high. More specifically, the sphericity of the polymer particles is preferably 85% or more, and more preferably 90% or more. Here, the sphericity is determined by randomly selecting 30 particles in an FRP cross-sectional photograph, and calculating a sphericity from the minor axis length and the major axis length thereof according to the following mathematical formula.

$$S = \sum_{i=1}^{n} (b/a)/n \times 100 \qquad \text{[Mathematical Formula 2]}$$

S: sphericity (%), a: major axis length, b: minor axis length, and n: number of measurements 30.

Examples of a commercially available product of the spherical polymer particles include SP-500 and SP-10 (manufactured by Toray Industries, Inc.) as a polyamide-based product, MBX series such as MBX-12 and SSX series such as SSX-115 (manufactured by Sekisui Kasei Co., Ltd.) as a polymethyl methacrylate-based product, SBX series such as SBX-12 (manufactured by Sekisui Kasei Co., Ltd.) as a polystyrene-based product, MSX and SMX (manufactured by Sekisui Kasei Co., Ltd.) as copolymers of them, DAIMICBEAZ CM series as a polyurethane-based product, BELLOCEA (manufactured by Daicel Corporation) as a cellulose acetate type, and Marilin (manufactured by Gunei Chemical Industry Co., Ltd.) as a phenolic resin-based product. Examples of spherical particles made of a polyamide or a copolymer thereof include the polyamide-based particles disclosed in Example 1 of Japanese Patent Laid-open Publication No. 01-104624 and the polyamide-based particles disclosed in WO 2018/207728 A. Examples of polyether sulfone-based spherical particles include those disclosed in Japanese Patent Laid-open Publication No. 2017-197665. Among them, the polyamide-based particles disclosed in Example 1 of Japanese Patent Laid-open Publication No. 01-104624 are preferable because they are superior in wet heat resistance, chemical resistance, and the like, and are superior in the effect of exhibiting impact resistance in use for forming FRP. The particle diameter of the polymer particles added at the time of preparing the intermediate base material is preferably 5 μm or more and 45 μm or less in terms of mode diameter determined by a light scattering method. By setting the mode diameter of the polymer particles within this range, stable impact resistance can be imparted to FRP. The mode diameter of the polymer particles is more preferably 10 to 20 μm. The particle diameter can be measured by applying a light scattering method, and using, for example, Partica LA-950V2 manufactured by HORIBA, Ltd., MT3300 II manufactured by Microtrac Inc., or SALD series manufactured by Shimadzu Corporation.

The matrix resin used for the FRP of the present invention preferably includes a thermosetting resin, a thermoplastic resin, and a curing agent, but may be a thermosetting resin and a curing agent or only a thermoplastic resin. As the thermosetting resin, an epoxy resin is commonly used. Especially, an epoxy resin containing an amine, a phenol, or a compound having a carbon-carbon double bond as a precursor is preferably used. Specifically, examples of the epoxy resin containing an amine as a precursor include isomers of tetraglycidyldiaminodiphenylmethane, triglycidyl-p-aminophenol, triglycidyl-m-aminophenol, and triglycidylaminocresol; examples of the epoxy resin containing a phenol as a precursor include a bisphenol A type epoxy resin, a bisphenol F type epoxy resin, a bisphenol S type epoxy resin, a phenol novolac type epoxy resin, and a cresol novolac type epoxy resin; and examples of the epoxy resin containing a compound having a carbon-carbon double bond as a precursor include an alicyclic epoxy resin, but the thermosetting resin is not limited to these.

In order to improve the tensile strength of the FRP, it is effective to reduce the crosslinking density of a matrix resin, but if the crosslinking density is simply reduced, the heat resistance and the elastic modulus are reduced. Therefore, it is also preferable to use at least one resin selected from among dicyclopentadiene-type epoxy resins having a rigid skeleton and glycidylaniline-type epoxy resins which are pendant type epoxy resins as the epoxy resin to be contained in the matrix resin. When a dicyclopentadiene-type epoxy resin is used, it is preferable that the epoxy equivalent thereof is set to 200 g/eq or more and 265 g/eq or less because the compatibility with a thermoplastic resin (especially, polyethersulfone) to be used in combination is improved. The glycidylaniline-type epoxy resin or the dicyclopentadiene-type epoxy resin can be applied to both the primary resin composition and the secondary resin composition. However, it is preferable to use the glycidylaniline-type epoxy resin or the dicyclopentadiene-type epoxy resin for at least the secondary resin composition because the effect of improving the tensile strength of the FRP is observed. Brominated epoxy resins obtained by brominating these epoxy resins are also used. An epoxy resin containing an aromatic amine typified by tetraglycidyldiaminodiphenylmethane as a precursor is most suitable for the present invention because it has good heat resistance and good adhesion to reinforcing fibers.

The thermosetting resin is preferably used in combination with a curing agent. For example, when the thermosetting resin is an epoxy resin, the curing agent is just required to be a compound having an active group capable of reacting with an epoxy group. As the curing agent, a compound having an amino group, an acid anhydride group, or an azide group is suitable. Specifically, dicyandiamide, various isomers of diaminodiphenyl sulfone, and aminobenzoic acid esters are suitable. Dicyandiamide is preferably used because it is superior in the preservability of a prepreg. In addition, isomers of diaminodiphenyl sulfone are most suitable for the present invention because they will afford cured products with good heat resistance. As the aminobenzoic acid esters, trimethylene glycol di-p-aminobenzoate or neopentyl glycol di-p-aminobenzoate is preferably used. Since the aminobenzoic acid esters are inferior in heat resistance but superior in tensile strength to diaminodiphenyl sulfone, and they are selected and used depending on the application. In addition, a curing catalyst can also be used, as necessary.

From the viewpoint of improving the pot life of a coating liquid, it is also possible to use a curing agent or a complexing agent capable of forming a complex with a curing catalyst in combination.

As the matrix resin, it is also preferable to use a mixture of a thermosetting resin and a thermoplastic resin. The mixture of the thermosetting resin and the thermoplastic resin gives better results than when the thermosetting resin is used alone. This is because a thermosetting resin can be molded at a low pressure by an autoclave though it generally has a defect of being brittle, whereas a thermoplastic resin is difficult to mold at a low pressure by an autoclave though it has an advantage of being generally tough, that is, these resins have opposite characteristics, and therefore a balance between physical properties and moldability can be achieved by using a mixture of the thermosetting resin and the thermoplastic resin. When the thermosetting resin and the thermoplastic resin are mixed and used, it is preferable that the thermosetting resin is contained in an amount of more than 50 mass % from the viewpoint of dynamic characteristics of the FRP prepared by curing the prepreg.

As the thermoplastic resin, a polymer having a bond selected from among carbon-carbon bond, amide bond, imide bond, ester bond, ether bond, carbonate bond, urethane bond, urea bond, thioether bond, sulfone bond, imidazole bond, and carbonyl bond in the main chain may be used. Specific examples include polyacrylate, polyolefin, polyamide (PA), aramid, polyester, polycarbonate (PC), polyphenylene sulfide (PPS), polybenzimidazole (PBI), polyimide (PI), polyetherimide (PEI), polysulfone (PSU), polyethersulfone (PES), polyetherketone (PEK), polyetheretherketone (PEEK), polyetherketoneketone (PEKK), polyaryletherketone (PAEK), and polyamideimide (PAI). In fields where heat resistance is required, such as aircraft applications, PPS, PES, PI, PEI, PSU, PEEK, PEKK, PAEK, and the like are suitable. On the other hand, in industrial applications, automobile applications, and the like, polyolefins such as polypropylene (PP), PA, polyester, PPS, and the like are suitable in order to increase molding efficiency. These may be polymers, or oligomers or monomers may be used for low viscosity or low temperature application. According to the purpose, these may be copolymerized or some of these may be mixed and used as a polymer blend or a polymer alloy.

It is preferable that the FRP of the present invention has an electrical conductivity in the thickness direction of 1 S/m or more because there is a possibility that a lightning protection system in an aircraft can be simplified. The electrical conductivity is more preferably 5 S/m or more, and even more preferably 15 S/m or more.

In addition, the compression strength after impact (CAI) of FRP, which is an index of impact resistance important for aircraft applications, is preferably 250 MPa or more, and more preferably 280 MPa or more.

Next, a method for obtaining the FRP of the present invention will be described in detail. Considering that the FRP of the present invention is used for a structural material of an aircraft, it is preferable to use a prepreg using a UD material as a reinforcing fiber layer as an intermediate base material. From this viewpoint, it is preferable to use carbon fibers as the reinforcing fibers. When used in a cover prepreg to be attached to the surface of a prepreg for a structural material or in a complex shaped FRP, reinforcing fiber fabric or glass fiber can also be used as the reinforcing fiber layer.

The prepreg to be used in the present invention is one obtained by impregnating a reinforcing fiber layer with a resin composition. As a method for producing the prepreg, it is preferable to use a two-step impregnation method including a step of impregnating a reinforcing fiber layer with a primary resin composition using a primary resin composition film to obtain a primary prepreg, and a step of applying a secondary resin composition to the primary prepreg using a secondary resin composition film to obtain a prepreg.

In the following, a prepreg using a thermosetting resin as a matrix resin and using a carbon fiber UD material as a reinforcing fiber layer will be described as an example.

First, for a primary prepreg, a primary resin composition including an epoxy resin, an aromatic amine type curing agent, and a thermoplastic resin is prepared by kneading. The primary resin composition is applied to a substrate (release paper) using a roll coater to prepare a primary resin composition film. Then, carbon fiber bundles are aligned to form a UD sheet, the primary resin composition films are applied to the UD sheet from the above and the below thereof, preheated, and then pressurized with nip rolls to impregnate the UD sheet with the primary resin composition, thereby affording a primary prepreg. At this time, it is preferable to set a high degree of impregnation of the primary prepreg.

Next, a secondary resin composition including an epoxy resin, an aromatic amine type curing agent, a thermoplastic resin, polymer particles, and conductive particles is prepared, and applied to a substrate (release paper) using a roll coater to prepare a secondary resin composition film.

When the secondary resin composition film is prepared, generally, a blade coater such as a knife coater is often used as a coater. In all Examples of Patent Documents 1 and 2 cited in Background Art was used a knife coater. In a blade coater, however, since the coating resin amount is determined by the clearance between the blade and a substrate, it is difficult for conductive particles having a large particle diameter to pass through the coater. As described above, in the present invention, considering that conductive particles large in particle diameter are sunk in a reinforcing fiber layer, thereby reducing the thickness of a resin layer, one of the points of the production of a prepreg is that conductive particles large in particle diameter are incorporated in a secondary resin composition film. For this reason, it is necessary to increase the clearance of the coater as much as possible, but in this case, there arises a problem that the amount of the resin becomes excessively large and the basis weight of the secondary resin composition film becomes excessively large, so that a resin basis weight desired as a prepreg cannot be obtained. In order to solve this problem, it is considered that it is effective for achieving both the clearance and the desired resin basis weight to increase the winding speed at the time of preparing the film and increase the amount of the supplied resin per unit time. However, in a commonly used knife coater, when the amount of resin supply per unit time increases, the flexure of a blade due to the resin pressure becomes significant and the uniformity of a resin film may be impaired, and the limit of the resin supply amount is low.

In the method for producing a prepreg of the present invention, a roll coater is preferably used when a secondary resin composition film is produced. Since the roll coater transfers a supply resin to a roll and further transfers the supply resin to a substrate (release paper or the like), the roll coater essentially has good coater passability even with conductive particles having a large particle diameter. In the roll coater, it is important to uniformly transfer the resin onto the transfer roll and to make the film thickness uniform. Therefore, a counter roll to be opposed to the transfer roll is often disposed. Also at this time, when the amount of the resin to be supplied per unit time increases, the resin pressure at the clearance between the transfer roll and the counter roll increases. However, since the roll itself is thick, it is difficult to bend even when the resin pressure becomes high, and the upper limit of the amount of the resin to be supplied is high. In addition, the clearance may also be increased according to the resin pressure, and from this point of view as well, it is easy to pass conductive particles having a large particle diameter. Furthermore, the resin for coating can be stretched between the transfer roll and a traveling substrate, and the amount of the resin to be supplied can be further increased. From these, when a secondary resin composition film is prepared by a roll coater, it is easy to pass conductive particles having a large particle size therethrough, which is preferable.

Then, the secondary resin composition film is imparted onto both the upper and lower surfaces of the primary prepreg, preheated, and then pressurized with nip rolls, affording a prepreg in which the secondary resin composition is imparted on the primary resin composition. At this time, it is desirable to sufficiently perform preheating to sufficiently secure the fluidity of the secondary resin composition.

Japanese Patent Laid-open Publication (Translation of PCT Application) No. 2014-505133 (WO2012/084197) [0054] to [0067] describes that controlled destruction of unidirectional structural fibers is intentionally caused by one-step impregnation using an S-wrap roller to afford an FRP having conductivity in the thickness direction. However, as described in Table 3 of the above-cited publication, the 0° tensile strength and CAI of an FRP obtained by using S-wrap one-step impregnation tend to be lower than those of an FRP obtained by using two-step impregnation. This is considered to be because in the former case, the disturbance of the thicknesses of the CF layer and the resin layer is excessively large.

In the present invention, by forming a prepreg by the two-step impregnation method as described above, it is easy to form a structure in which conductive particles large in particle diameter are sunk in a reinforcing fiber layer, and a portion other than the "sinking" portion can have a relatively uniform resin layer thickness. Therefore, a resulting FRP is not only high in conductivity in the thickness direction but also advantageous from the viewpoint of mechanical properties.

In recent years, in order to improve the efficiency of the step of stacking prepregs, devices called Automated Tape Laying (ATL) or Automated Fiber Placement (AFP) for automatically stacking narrow prepregs or prepreg tapes have been widely used. The prepreg tapes can be obtained by slitting a prepreg into a narrow width. As a slitting method, methods such as shear cutting, score cutting, leather cutting, heat cutting, water jet cutting, and ultrasonic cutting can be used.

The prepregs or prepreg tapes prepared as described above are stacked, and then, as necessary, the prepregs or prepreg tapes are pressurized and heated and shaped and the resin is cured. Thus, an FRP can be produced. As a method for producing the FRP, a hot press molding method or the like can be used. More specifically, a press molding method, an autoclave molding method, a bagging molding method, a wrapping tape method, an internal pressure molding method, and the like can be used.

As to the temperature for molding the FRP, when an epoxy resin is used as the matrix resin, the FRP is preferably molded at a temperature in the range of 150° C. to 220° C.

The pressure for molding the FRP by the autoclave molding method varies depending on the thickness of the prepreg, the volume content of the reinforcing fiber, and the like, but is usually a pressure in the range of 0.1 to 1 MPa. As a result, it is possible to obtain an FRP in which defects such as voids are not present and which exhibits small dimensional variations such as warpage.

The FRP of the present invention can be suitably used for a structure for an aircraft. The structure for an aircraft is selected from among a flat plate structure, a cylindrical structure, a box-shaped structure, a C-shaped structure, an H-shaped structure, an L-shaped structure, a T-shaped structure, an I-shaped structure, a Z-shaped structure, a hat-shaped structure, and the like. These structures are combined to constitute parts of an aircraft. Details are described in, for example, "Structural Design of Aircrafts", 5th Edition, Torikai and Kuze, Japan Aeronautical Engineers' Association (2003). Such a structure can be obtained by shaping a prepreg as described in, for example, WO2017/110991 [0084], WO2016/043156[0073], and WO2019/0314078 [0088]. In addition, a structure having a desired shape can be obtained by automatically stacking prepreg tapes on a mold having the aforementioned desired shape and then curing the prepreg tapes.

In manufacturing an aircraft, a fuselage, a main wing, a center wing, an empennage, and the like are formed from a joint structure in which a plurality of the structures described above are joined. As a method for joining the structures, so-called fasteners such as bolts and rivets can be used, and an adhesive film or the like can also be used. Furthermore, it is also possible to use a co-cure method in which uncured prepreg stacks or semi-cured prepreg stacks are joined and then cured.

EXAMPLES

Hereinafter, the present invention will be described in detail with reference to examples. However, the scope of the present invention is not limited to these examples. The unit "part" of the composition ratio refers to part by mass unless otherwise noted. In addition, measurement of various properties (physical properties) was performed under the environment of a temperature of 23° C. and a relative humidity of 50% unless otherwise noted.

Raw Materials Used in Examples and Comparative Examples (1) Reinforcing Fiber (Carbon Fiber)

A carbon fiber having the number of filaments of 12,000, a tensile strength of 5.8 GPa, and a tensile modulus of elasticity of 280 GPa was prepared. Electric treatment was performed such that the [O/C] of the carbon fiber was 0.10 or less.

(2) Epoxy Resin

"EPICLON" HP-7200L (dicyclopentadiene-type epoxy resin, epoxy equivalent: 246 g/eq, manufactured by DIC Corporation)

"SUMIEPDXY" ELM434 (tetraglycidyldiaminodiphenylmethane, manufactured by Sumitomo Chemical Co., Ltd., epoxy equivalent: 120 g/eq)

"EPICLON" 830 (bisphenol F-type epoxy resin, manufactured by DIC Corporation, epoxy equivalent: 171 g/eq)

jER 825 (bisphenol A-type epoxy resin, manufactured by Mitsubishi Chemical Corporation, epoxy equivalent: 170 to 180 g/eq)

GOT (glycidylaniline-type epoxy resin (N,N-diglycidyl-o-toluidine), manufactured by Nippon Kayaku Co., Ltd.).

(3) Curing Agent

SEIKACURE-S (4,4'-DDS, active hydrogen equivalent: 62 g/eq, manufactured by Seika Corporation).

(4) Thermoplastic Resin (PES)

"Virantage (registered trademark)" VW-10700RFP (PES, manufactured by Solvay Advanced Polymers LLC)

"SUMIKA EXCEL" 5003P (PES, manufactured by Sumitomo Chemical Co., Ltd.)

(5) Polymer Particles

Truly spherical polyamide 6 particles (mode diameter: 15 μm, sphericity: 96%) obtained by the following production method. The particle diameter was measured using MT3300 II (light source: 780 nm-3 mW, wet cell (medium: water)) manufactured by Microtrac Inc.

With reference to WO 2018/207728, 200 g of ε-caprolactam (manufactured by Toray Industries, Inc.), 800 g of polyethylene glycol (class 1 polyethylene glycol 20,000 manufactured by Wako Pure Chemical Industries, Ltd., weight average molecular weight: 18,600) as a polymer of the second component, and 1,000 g of water were charged in an autoclave equipped with a 3 L helical ribbon type stirring blade to form a homogeneous solution. Then, the autoclave was sealed, and the inside of the autoclave was purged with nitrogen. Thereafter, the stirring speed was set to 100 rpm, and the temperature was raised to 240° C. At this time, after the pressure of the system reached 10 kg/cm², the pressure was controlled while slightly releasing water vapor such that the pressure was maintained at 10 kg/cm². After the temperature reached 240° C., the pressure was released at a rate of 0.2 kg/cm²·min. Thereafter, the temperature was maintained for 1 hour while nitrogen was allowed to flow, to complete the polymerization. The mixture was discharged into a 2,000 g water bath to yield a slurry. Soluble components were dissolved, and the resultant slurry was filtrated to afford a solid material on the filter. Then, 2,000 g of water was added to the solid material, followed by washing at 80° C. Thereafter, a slurry liquid allowed to pass through a 200 μm sieve and resulting from the removal of aggregates was filtered again to isolate a solid material on the filter. The isolated solid material was then dried at 80° C. for 12 hours to afford 140 g of a polyamide 6 powder. The obtained powder had a melting point of 218° C. similarly to polyamide 6, and a crystallization temperature of 170° C.

(6) Conductive Particles (Carbon Particles)

"NICABEADS" ICB (average particle diameter (number basis): 27 μm, manufactured by Nippon Carbon Co., Ltd.)

(7) Conductive Auxiliary Agent (Carbon Black)

Mitsubishi "Carbon Black" #3230B (particle diameter of primary particles: 23 nm (arithmetic average diameter determined by observing carbon black particles with an electron microscope), manufactured by Mitsubishi Chemical Corporation)

Evaluation Methods (1) Preparation of Resin Composition

An epoxy resin and a thermoplastic resin were kneaded and heated to 150° C. or higher, and the mixture was stirred for 1 hour to dissolve the thermoplastic resin, thereby affording a transparent viscous liquid. This liquid was cooled while being kneaded, and then a curing agent was added and the mixture was further kneaded, affording a primary resin composition.

In addition, an epoxy resin and a thermoplastic resin were kneaded and heated to 150° C. or higher, and the mixture was stirred for 1 hour to dissolve the thermoplastic resin, thereby affording a transparent viscous liquid. This liquid was cooled while being kneaded, and then a curing agent, polymer particles, and conductive particles were added and kneaded, affording a secondary resin composition.

The composition ratios of the resin compositions of Examples and Comparative Examples are shown in Table 1.

(2) Preparation of Prepreg

The prepreg of each Examples was prepared using a two-stage impregnation method as follows. The primary resin composition and the secondary resin composition prepared in the above (1) were uniformly applied onto release paper coated with silicone using a roll coater equipped with a counter roll, affording a primary resin composition film and a secondary resin composition film, respectively. At this time, in the preparation of the secondary resin composition film, the winding speed of a resin film was set to 15 m/min and stretching of the resin was made to occur between a transfer roll and the traveling release paper, and thereby the amount of the resin supplied per unit time was increased and the clearance in the roll coater was set sufficiently large. Then, carbon fibers uniformly aligned in one direction were sandwiched between two primary resin composition films, and heated and pressurized using a press roll, affording a primary prepreg in which the carbon fibers were sufficiently impregnated with the primary resin composition (basis weight of carbon fibers: 268 g/cm², resin content: 20 mass %). The release paper was peeled off from the obtained primary prepreg. Next, the primary prepreg was sandwiched between two secondary resin composition films, and heated and pressurized using a press roll, affording a prepreg in which the primary prepreg was impregnated with the secondary resin composition (basis weight of carbon fibers: 268 g/cm², resin content: 34 mass %).

For the prepreg of Comparative Example, a resin film was prepared using a common knife coater. The winding speed of the resin film at the time of preparing the secondary resin composition film was 2 m/min. Primary prepregs and prepregs were prepared in the same manner as in Examples.

(3) Cross Section Observation and Sinking Evaluation of CFRP

Sixteen plies of the prepreg obtained as described above were pseudo-isotropically stacked in a [+45°/0°/−45°/90°]2s configuration, and then the resin was cured in an autoclave at a temperature of 180° C. for 2 hours, a pressure of 6 kg/cm², and a heating rate of 1.5° C./min to prepare a CFRP (flat plate structure).

A cut sample of about 20 mm×20 mm was obtained from the obtained CFRP, embedded and cured with an epoxy resin, and an edge portion was ground. The ground surface was observed using a digital microscope VHX-5000 manufactured by KEYENCE CORPORATION. The magnification was basically set to 200 times, but the magnification was sometimes adjusted as necessary to improve the resolution or grasp the entire image.

A. Connection of Upper and Lower CF Layers with One Carbon Particle

When in the aforementioned cross-sectional photograph, in a CF layer adjacent to a carbon particle, there were three or more CFs having a distance of 7 μm or less from the surface of the carbon particle, it was determined that the carbon particle was in contact with the CF layer. Then, when one focused carbon particle was in contact with both the upper and lower CF layers, it was determined that the upper and lower CF layers were connected by one carbon particle.

B. Determination of Sinking/Frequency of Sinking

When in a CFRP cross-sectional photograph, the boundary line between a CF layer and a resin layer was not substantially straight but had a portion recessed in an arc shape along a carbon particle and the length of sinking was 15 μm or more, it was determined that the carbon particle was sunk. Then, when one or more sites where a conductive particle was sunk were observed per 50 mm of the resin layer length, it was determined that there was a sinking portion.

At this time, it is necessary to have successfully observed the carbon particles simultaneously with the arc-shaped recess at the boundary line between the CF layer and the resin layer.

The frequency of sinking refers to the number of carbon particles sunk in the CF layer per 50 mm of the resin layer length. In addition, the resin layer length means the length (L) of a straight line passing through the center of the resin layer when a CFRP cross-sectional photograph is taken. The magnification at the time of photographing the cross-sectional photograph is 200 times. In addition, the CFRP cross-sectional photograph is taken by randomly selecting the number of CFRP cross-sectional photographs enough to obtain a sufficient length of the resin layer (50 mm or more in total).

C. Amount of Sinking

First, the length of sinking will be described with reference to FIG. 4. First, a boundary line between a reinforcing fiber layer 1″ and a resin layer 2′ is determined. On the left side of a conductive particle 3, an auxiliary line LL is drawn at the center of a reinforcing fiber 5 closest to the conductive particle. Then, an auxiliary line LH is drawn at the center of a reinforcing fiber 6 that is located closest to the resin layer up to 100 μm on the left side from the reinforcing fiber 5. Then, an auxiliary line LC is drawn at the middle of LL and LH. The same operations are performed on the right side, and an auxiliary line RC is drawn (drawing of the right auxiliary lines is omitted). Then, an auxiliary line CC is drawn between LC and RC. Then, a perpendicular line is drawn from the auxiliary line CC toward a vertex of the portion where the boundary line between the reinforcing fiber layer 1″ and the resin layer 2′ is recessed in an arc shape, and the length of the vertex is defined as the length of sinking 9 of the conductive particle.

The amount of sinking is a value obtained by dividing the length of sinking of a focused carbon particle by the cross-sectional diameter of the target conductive particle. Three conductive particles connecting the reinforcing fiber layers were randomly selected and their amounts of sinking were measured, and then the average value thereof was calculated.

(4) Sphericity of Conductive Particle

From a CFRP cross-sectional photograph taken at a magnification of 200 times, 30 conductive particles were randomly selected, and from the minor axis length and the major axis length thereof, a sphericity was calculated according to the following formula.

$$S = \sum_{i=1}^{n}(b/a)/n \times 100 \qquad \text{[Mathematical Formula 3]}$$

S: sphericity (%), a: major axis length, b: minor axis length, and n: number of measurements 30.

(5) Resin Layer Thickness

In the CFRP cross-sectional photograph obtained in (3), the area of a resin layer was determined using image analysis software Winroof, and divided by the length of the target resin layer to calculate the thickness of one resin layer in the cross-sectional photograph. This operation was performed for randomly selected eight layers, and the average value of the resin layer thicknesses was determined.

(6) Electrical Conductivity of CFRP in the Thickness Direction

Sixteen plies of the prepreg obtained as described above were pseudo-isotropically stacked in a [+45°/0°/−45°/90°]2s configuration, and then the resin was cured in an autoclave at a temperature of 180° C. for 2 hours, a pressure of 6 kg/cm², and a heating rate of 1.5° C./min to prepare a CFRP. A sample of 40 mm long and 40 mm wide was cut out from the obtained CFRP, and the resin layers on both surfaces were removed by grinding. Thereafter, a conductive paste N-2057 (manufactured by SHOEI CHEMICAL INC.) was applied to both surfaces with a thickness of about 70 μm using a bar coater, and cured over 30 minutes in a hot air oven adjusted to a temperature of 180° C. Thus, a sample for evaluating conductivity was obtained. The resistance of the obtained sample in the thickness direction was measured by a four-probe method using an R6581 digital multimeter manufactured by ADVANTEST CORPORATION. The measurement was performed six times, and the average value was taken as the volume resistivity (Ωcm) of the CFRP in the thickness direction. From this, an electrical conductivity (S/m) was calculated.

(7) 0° Tensile Strength of CFRP

The prepreg obtained as described above was cut into a prescribed size, and four sheets were stacked in one direction, then a vacuum bag was performed, and curing was performed using an autoclave at a temperature of 180° C. and a pressure of 6 kg/cm² for 2 hours. Thus, a unidirectional reinforcement was obtained. The obtained unidirectional reinforcement was cut into a width of 12.7 mm and a length of 230 mm, and a tab made of glass fiber-reinforced plastic having 1.2 mm and a length of 50 mm was bonded to both ends, affording a test piece. This test piece was subjected to a 0° tensile test in accordance with the standard of JIS K 7073 (1988) using an Instron universal tester. The measurement temperature was room temperature (23° C.)

(8) Compression after Impact (CAI) of CFRP

Sixteen plies of the prepreg obtained as described above were pseudo-isotropically stacked in a [+45°/0°/−45°/90°]2s configuration, and then the resin was cured in an autoclave at a temperature of 180° C. for 2 hours, a pressure of 6 kg/cm², and a heating rate of 1.5° C./min to prepare a CFRP. From the obtained CFRP, a sample of 150 mm long and 100 mm wide was cut out, a drop weight impact of 6.7 J/mm was applied to the center of the sample in accordance with SACMA SRM 2R-94, and a compression after impact (CAI) was determined by performing a compression breaking test.

Example 1

A prepreg was produced in accordance with the method of (2) above with the composition given in Table 1, and the CFRP (flat plate structure) was evaluated as described above. At this time, the content of the carbon particles was 1.0 mass % based on the total mass of the epoxy resin, the curing agent, the thermoplastic resin, the carbon particles, and the carbon black, and the content of the carbon black was 1.5 mass % based on the total mass of the epoxy resin, the curing agent, the thermoplastic resin, the carbon particles, and the carbon black. As a result of the observation of the cross section of the CFRP, there was a portion where upper and lower carbon fiber layers were connected by one carbon particle as shown in FIG. 1 and "sinking" of the carbon particle could be confirmed. In addition, as compared with the CFRP of Comparative Example 1 prepared using the same raw materials, the average thickness of the resin layer was thin and the electrical conductivity in the thickness direction was high. From this fact, it was considered that the addition amount of carbon particles can be reduced as compared with Comparative Example 1 when the electrical conductivity is to be the same.

In addition, when the variation range of the thickness of the resin layer from the average value was examined, the maximum value was +15% and the minimum value was −10% at the number of measurements n=8, which were clearly different from those of the CFRP having a large interlayer thickness variation described in WO2012/084197 (Japanese Patent Laid-open Publication (Translation of PCT Application) No. 2014-505133).

Furthermore, the impact resistance and the 0° tensile strength were sufficiently high for use as a primary structural material of an aircraft.

Comparative Example 1

A prepreg was prepared using exactly the same carbon fiber and resin composition (containing polymer particles, carbon particles, and carbon black) as in Example 1, and a CFRP (flat plate structure) was prepared in the same manner as in Example 1. A representative example of this cross-sectional observation photograph is shown in FIG. 2, but "sinking" of a carbon particle was not observed.

Example 2

A CFRP (flat plate structure) was prepared in the same manner as in Example 1 with the composition shown in Table 1. At this time, the content of the carbon particles was 1.0 mass % based on the total mass of the epoxy resin, the curing agent, the thermoplastic resin, and the carbon particles. As a result of the observation of the cross section thereof, there was a portion where upper and lower carbon fiber layers were connected by one carbon particle and "sinking" of the carbon particle could be confirmed. The electrical conductivity in the thickness direction was also as high as 12 S/m.

When the variation range of the thickness of the resin layer from the average value was examined, the maximum value was +10% and the minimum value was −7% at the number of measurements n=8. Furthermore, the impact resistance and the 0° tensile strength were sufficiently high for use as a primary structural material of an aircraft.

Example 3

A CFRP (flat plate structure) was prepared in the same manner as in Example 1 with the composition shown in Table 1. At this time, the content of the carbon particles was 1.0 mass % based on the total mass of the epoxy resin, the curing agent, the thermoplastic resin, and the carbon particles. As a result of the observation of the cross section thereof, there was a portion where upper and lower carbon fiber layers were connected by one carbon particle and "sinking" of the carbon particle could be confirmed. The electrical conductivity in the thickness direction was also as high as 13 S/m.

When the variation range of the thickness of the resin layer from the average value was examined, the maximum value was +12% and the minimum value was −12% at the number of measurements n=8. Furthermore, the impact resistance and the 0° tensile strength were sufficiently high for use as a primary structural material of an aircraft.

Example 4

A CFRP (flat plate structure) was prepared in the same manner as in Example 1 with the composition shown in Table 1. At this time, the content of the carbon particles was 1.0 mass % based on the total mass of the epoxy resin, the curing agent, the thermoplastic resin, the carbon particles, and the carbon black. As a result of the observation of the cross section thereof, there was a portion where upper and lower carbon fiber layers were connected by one carbon particle and "sinking" of the carbon particle could be confirmed. Since carbon black as a conductive auxiliary agent was used in combination, the electrical conductivity in the thickness direction conductivity was 18 S/m, which was higher than that in Example 3.

When the variation range of the thickness of the resin layer from the average value was examined, the maximum value was +12% and the minimum value was −12% at the number of measurements n=8. Furthermore, the impact resistance and the 0° tensile strength were sufficiently high for use as a primary structural material of an aircraft.

Example 5

A CFRP (flat plate structure) was prepared in the same manner as in Example 1 with the composition shown in Table 1. As a result of the observation of the cross section thereof, there was a portion where upper and lower carbon fiber layers were connected by one carbon particle and "sinking" of the carbon particle could be confirmed. The electrical conductivity in the thickness direction was 8 S/m.

When the variation range of the thickness of the resin layer from the average value was examined, the maximum value was +12% and the minimum value was −12% at the number of measurements n=8. Furthermore, the impact resistance and the 0° tensile strength were also sufficient for use as a primary structural material of an aircraft.

TABLE 1-1

| | | Example 1 | | Comparative Example 1 | | Example 2 | |
|---|---|---|---|---|---|---|---|
| | | Primary resin | Secondary resin | Primary resin | Secondary resin | Primary resin | Secondary resin |
| Epoxy resin | HP-7200L | 50 | 50 | 50 | 50 | 30 | 30 |
| | ELM434 | 20 | 20 | 20 | 20 | 40 | 40 |
| | EPICLON830 | 30 | 30 | 30 | 30 | 30 | 30 |

TABLE 1-1-continued

| | | Example 1 | | Comparative Example 1 | | Example 2 | |
|---|---|---|---|---|---|---|---|
| | | Primary resin | Secondary resin | Primary resin | Secondary resin | Primary resin | Secondary resin |
| | jER825 | — | — | — | — | — | — |
| | GOT | — | — | — | — | — | — |
| Thermoplastic resin | VW-10700RFP | 3 | 11 | 3 | 11 | 7 | 14.5 |
| | 5003P | — | — | — | — | — | — |
| Polymer particle | Truly spherical polyamide 6 | — | 33.9 | — | 33.9 | — | 33.5 |
| Conductive particle | ICB | — | 3 | — | 3 | — | 3.1 |
| Conductive auxiliary agent | Carbon black | 2.2 | 2.2 | 2.2 | 2.2 | — | — |
| Curing agent | 4,4'-DDS (SEIKACURE) | 34.1 | 33.9 | 34.1 | 33.9 | 39.1 | 39.1 |

TABLE 1-2

| | | Example 3 | | Example 4 | | Example 5 | |
|---|---|---|---|---|---|---|---|
| | | Primary resin | Secondary resin | Primary resin | Secondary resin | Primary resin | Secondary resin |
| Epoxy resin | HP-7200L | — | — | — | — | — | — |
| | ELM434 | 55 | 55 | 55 | 55 | 58 | 58 |
| | EPICLON830 | 20 | 20 | 20 | 20 | 15 | 15 |
| | jER825 | — | — | — | — | — | — |
| | GOT | 25 | 25 | 25 | 25 | — | — |
| Thermoplastic resin | VW-10700RFP | — | — | — | — | — | — |
| | 5003P | 9 | 18 | 9 | 18 | 6 | 12.5 |
| Polymer particle | Truly spherical polyamide 6 | — | 38 | — | 38 | — | 55.7 |
| Conductive particle | ICB | — | 3.2 | — | 3.2 | 4.4 | 4.4 |
| Conductive auxiliary agent | Carbon black | — | — | 2.5 | 2.5 | — | — |
| Curing agent | 4,4'-DDS (SEIKACURE) | 40.3 | 40.3 | 40.3 | 40.3 | 45 | 45 |

TABLE 2

| | | | Example 1 | Comparative Example 1 | Example 2 | Example 3 | Example 4 | Example 5 |
|---|---|---|---|---|---|---|---|---|
| Conductive particle | Sphericity | % | 97 | 97 | 97 | 97 | 97 | 97 |
| | Connection of CF layers by one particle | — | Yes | Yes | Yes | Yes | Yes | Yes |
| | Sinking | — | Yes | No | Yes | Yes | Yes | Yes |
| | Maximum diameter in cross-sectional photograph | μm | 53 | 46 | 52 | 52 | 52 | 48 |
| | Amount of sinking | % | 20 | — | 20 | 20 | 20 | 15 |
| | Number of sinking | number | 5 | 0 | 5 | 5 | 5 | 4 |
| Polymer particle | Sphericity | % | 92 | 92 | 92 | 92 | 92 | 92 |
| | Flow into sinking | — | Yes | No | Yes | Yes | Yes | Yes |
| CFRP | Average value of thickness of resin layer | μm | 39 | 47 | 38 | 41 | 41 | 56 |

TABLE 2-continued

|  |  | Example 1 | Comparative Example 1 | Example 2 | Example 3 | Example 4 | Example 5 |
|---|---|---|---|---|---|---|---|
| Electrical conductivity in the thickness direction | S/m | 16 | 13 | 12 | 13 | 18 | 8 |
| Impact resistance (CAI) | MPa | 305 | — | 290 | 280 | 278 | 251 |
| 0° tensile strength | MPa | 3350 | — | 3020 | 3040 | 3036 | 2705 |

INDUSTRIAL APPLICABILITY

The FRP of the present invention is widely applicable to an industrial field in which conductivity is required for a material. In particular, when the FRP of the present invention is used for a structural member of an aircraft, a conventional lightning protection system, a static elimination system, an electromagnetic wave shielding system, and the like such as a metal foil or a metal mesh can be reduced, and therefore, it can be suitably used in this field.

DESCRIPTION OF REFERENCE SIGNS 1, 1', 1": Reinforcing fiber layer
2, 2': Resin layer
3: Conductive particle
3', 3": Region considered as a trace of a conductive particle cracking and partially falling off
4: Polymer particle
5: Fiber (for auxiliary line LL)
6: Fiber (for auxiliary line LH)
7: Fiber (for auxiliary line RL)
8: Fiber (for auxiliary line RH)
9: Length of sinking
A: Region where a conductive particle is sunk in a reinforcing fiber layer (within the scope of the present invention)
A': Region where a trace of a conductive particle cracking and partially falling off sinks in a reinforcing fiber layer (within the scope of the present invention)
B: Region where polymer particles have flowed in the periphery of a conductive particle sunk in reinforcing fibers
C1 to C4: Region where the boundary line between a reinforcing fiber layer and a resin layer is disordered (outside the scope of the present invention)
L1, L2: Each indicates the length of a resin layer
LL, LH, LC: Each indicates an auxiliary line on the left side of a conductive particle
RL, RH, RC: Each indicates an auxiliary line on right side of a conductive particle
CC: An auxiliary line for calculating a length of sinking is indicated

The invention claimed is:
1. A fiber-reinforced composite material comprising reinforcing fiber layers and a resin layer sandwiched therebetween, wherein conductive particles having a sphericity of 85% or more are disposed in the resin layer, and the fiber-reinforced composite material has a portion where upper and lower reinforcing fiber layers are connected by at least one conductive particle and has a portion where the at least one conductive particle is sunk in a reinforcing fiber layer, which means that a boundary line of the reinforcing fiber layer in contact with the conductive particle is recessed in an arc shape that is along the shape of the conductive particle with a recess depth of 15 μm or more.

2. The fiber-reinforced composite material according to claim 1, comprising conductive particles having a diameter of 15 μm or more.

3. The fiber-reinforced composite material according to claim 1, wherein the conductive particles are carbon particles.

4. The fiber-reinforced composite material according to claim 1, wherein polymer particles are disposed in the resin layer.

5. The fiber-reinforced composite material according to claim 1, wherein polymer particles are disposed in the resin layer and the polymer particles have a sphericity of 85% or more.

6. The fiber-reinforced composite material according to claim 1, wherein an amount of sinking of the conductive particles, which is a value obtained by dividing the length of sinking of the conductive particle by the cross-sectional diameter of the conductive particle, is 15% or more.

7. The fiber-reinforced composite material according to claim 1, wherein the number of conductive particles sunk in a reinforcing fiber layer is 2 or more per 50 mm of a resin layer length.

8. The fiber-reinforced composite material according to claim 4, wherein polymer particles have flowed in a periphery of a conductive particle sunk in reinforcing fibers.

9. The fiber-reinforced composite material according to claim 1, wherein an electrical conductivity in the thickness direction is 1 S/m or more.

10. A structure made of the fiber-reinforced composite material according to claim 1, wherein the structure is selected from among a flat plate structure, a cylindrical structure, a box-shaped structure, a C-shaped structure, an H-shaped structure, an L-shaped structure, a T-shaped structure, an I-shaped structure, a Z-shaped structure, and a hat-shaped structure.

* * * * *